(12) United States Patent
Langenbrunner et al.

(10) Patent No.: US 10,443,625 B2
(45) Date of Patent: Oct. 15, 2019

(54) AIRFOIL SINGLETS

(71) Applicant: General Electric Company, Schenectady, NY (US)

(72) Inventors: Leslie Louis Langenbrunner, Cincinnati, OH (US); Ian Francis Prentice, Cincinnati, OH (US); Rosa Lee Nemec, Cincinnati, OH (US); Adam Max Aresty, West Chester, OH (US); Ming Xie, Beavercreek, OH (US); Andrew McGee, Oxford, OH (US)

(73) Assignee: General Electric Company, Schenectady, NY (US)

( * ) Notice: Subject to any disclaimer, the term of this patent is extended or adjusted under 35 U.S.C. 154(b) by 416 days.

(21) Appl. No.: 15/271,312

(22) Filed: Sep. 21, 2016

(65) Prior Publication Data
US 2018/0080478 A1 Mar. 22, 2018

(51) Int. Cl.
F04D 29/64 (2006.01)
F04D 29/02 (2006.01)
(Continued)

(52) U.S. Cl.
CPC .......... *F04D 29/644* (2013.01); *F01D 9/042* (2013.01); *F04D 29/023* (2013.01);
(Continued)

(58) Field of Classification Search
CPC ...... F01D 9/042; F04D 29/023; F04D 29/522; F04D 29/542; F04D 29/644;
(Continued)

(56) References Cited

U.S. PATENT DOCUMENTS 4,832,568 A * 5/1989 Roth ............... F01D 9/042
415/189
5,131,808 A 7/1992 Ciais et al.
(Continued)

FOREIGN PATENT DOCUMENTS

EP 0466602 A1 1/1992
JP H0333403 A 2/1991
(Continued)

OTHER PUBLICATIONS

International Search Report & Written Opinion issued in connection with corresponding PCT Application No. PCT/US2017/041437 dated Feb. 5, 2018.

*Primary Examiner* — Igor Kershteyn
(74) *Attorney, Agent, or Firm* — Dority & Manning, P.A.

(57) ABSTRACT

Composite airfoil singlet, includes airfoil extending from base to tip of airfoil, integrally formed with no more than one outer platform at tip and/or no more than one inner platform at base. Parallel composite plies or woven fibers extend through airfoil and through outer and/or inner platforms. Outer and/or inner curved sections extend between outer and/or inner platforms and airfoil respectively. Assembly includes circular row of the composite airfoil singlets depending radially inwardly from and mounted to an outer shroud or casing. Outer and/or inner fasteners may secure outer and inner platforms to outer shroud or casing and an inner shroud respectively and include shanks extending substantially perpendicularly from outer and inner fastening plates though platform holes in outer and inner platforms and through outer and inner holes in outer shroud or casing and inner shroud respectively. Nuts are screwed on threaded ends of shanks.

17 Claims, 8 Drawing Sheets

(51) Int. Cl.
*F04D 29/52* (2006.01)
*F04D 29/54* (2006.01)
*F01D 9/04* (2006.01)

(52) U.S. Cl.
CPC ........ *F04D 29/542* (2013.01); *F05D 2240/80* (2013.01); *F05D 2260/31* (2013.01); *F05D 2300/6033* (2013.01); *F05D 2300/6034* (2013.01); *Y02T 50/672* (2013.01)

(58) Field of Classification Search
CPC ............ F05D 2220/32; F05D 2240/80; F05D 2260/31; F05D 2300/6033; F05D 2300/6034; Y02T 50/672
See application file for complete search history.

(56) References Cited

U.S. PATENT DOCUMENTS

| | | | | |
|---|---|---|---|---|
| 5,226,789 | A | * | 7/1993 | Donges ............... F01D 9/042 415/173.4 |
| 5,272,869 | A | * | 12/1993 | Dawson ............... F01D 9/042 415/142 |
| 8,147,191 | B2 | | 4/2012 | Baumhauer et al. |
| 8,459,942 | B2 | * | 6/2013 | Sjunnesson ........... F01D 5/3023 415/191 |
| 8,967,961 | B2 | | 3/2015 | McCaffrey |
| 9,103,214 | B2 | | 8/2015 | McCaffrey |
| 2003/0185673 | A1 | | 10/2003 | Matsumoto et al. |
| 2007/0248780 | A1 | * | 10/2007 | Schober ............... B29C 70/24 428/57 |
| 2012/0051923 | A1 | * | 3/2012 | McDonald ............ F01D 9/042 416/219 R |
| 2012/0301312 | A1 | * | 11/2012 | Berczik ............... C04B 37/00 416/230 |
| 2013/0052004 | A1 | * | 2/2013 | Stilin ............... F01D 9/042 415/211.2 |
| 2013/0149127 | A1 | * | 6/2013 | Hasting ............... F01D 9/042 415/200 |
| 2014/0140832 | A1 | * | 5/2014 | Hasting ............... F01D 9/042 415/190 |
| 2015/0354377 | A1 | | 12/2015 | Gimat et al. |
| 2016/0069199 | A1 | | 3/2016 | Duelm et al. |
| 2016/0082674 | A1 | | 3/2016 | Kray et al. |
| 2017/0009593 | A1 | | 1/2017 | Watanabe |

FOREIGN PATENT DOCUMENTS

| | | |
|---|---|---|
| JP | H0533602 A | 2/1993 |
| WO | 2013086296 A1 | 6/2013 |
| WO | 2013086305 A1 | 6/2013 |
| WO | 2013086315 A1 | 6/2013 |
| WO | 2016009817 A1 | 1/2016 |

\* cited by examiner

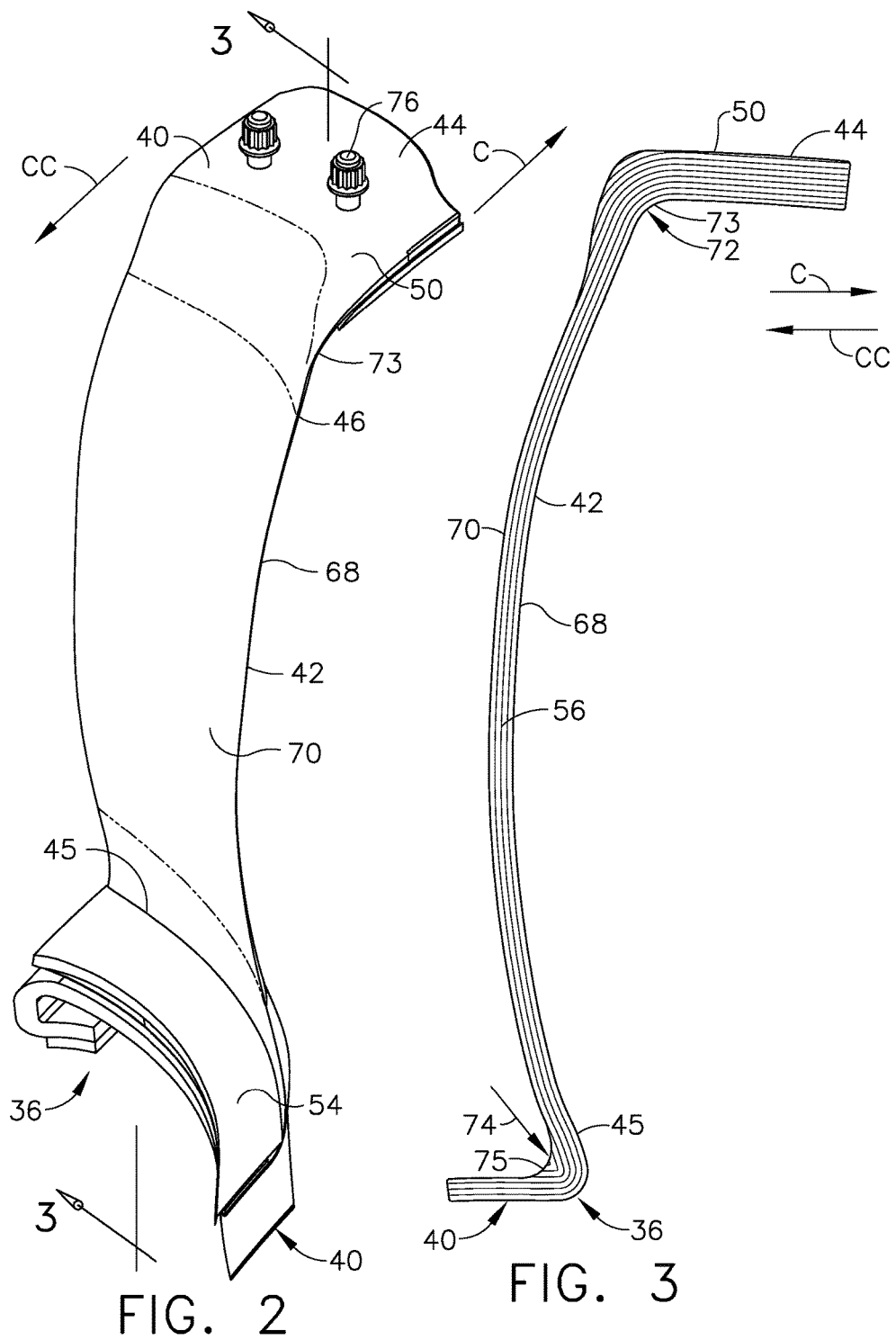

AIRFOIL SINGLETS

GOVERNMENT INTERESTS

This invention was made with government support under government contract No. FA8650-09-D-2922 by the Department of Defense. The government has certain rights to this invention.

BACKGROUND OF THE INVENTION

Technical Field

The present invention relates generally to turbomachinery components with composite airfoils such as vane segments and, more specifically, to composite vane segment with monolithic composite airfoils and platforms.

Background Information

Turbomachinery such as gas turbine engines may be used for power generation and for aircraft and marine propulsion and other applications, including vanes and, it is known to make these vanes out of composite material plies or laminates. Aircraft gas turbine engines flow air into a fan and then compress some of the air in a compressor, mix the compressed air with fuel and combust the mixture in a combustor for generating hot combustion gases. The gases flow downstream through a high pressure turbine (HPT) having one or more stages including one or more HPT turbine nozzles, shrouds, and rows of HPT rotor blades. The gases then flow to a low pressure turbine (LPT) which typically includes multi-stages with respective LPT turbine nozzles, shrouds, and LPT rotor blades. Air from the fan not flowed into the compressor may be bypassed around the compressor and discharged from the fan through fan exit guide vanes. It is known to construct vanes of plies of composite materials.

U.S. Pat. No. 9,103,214, entitled "Ceramic Matrix Composite Vane Structure With Overwrap For A Gas Turbine Engine", discloses a vane structure for a gas turbine engine which includes an airfoil section with a platform segment adjacent to a ring. The airfoil portion includes pressure and suction sides formed from respective first and second multiple of CMC plies and respective platform segments. Triangular areas at which the multiple of CMC uni-tape plies bend apart and continue to form the respective platform segments. These triangular areas are subject to high interlaminar tensile stress because of the differential of forces between the pressure and suction sides. The plies branching from the airfoil into both directions of the platform together with predominantly pressure side loading creates both interlaminar tensile and compression (ILT and ILC) stresses in the fillets by the triangular area often referred to as a noodle or deltoid. Low ILT (interlaminar tensile) material allowables lead to negative stress margins.

It is desirable to have singlets with integral airfoils and platforms with as low as possible interlaminar tensile and compression stresses.

BRIEF DESCRIPTION OF THE INVENTION

A composite airfoil singlet includes an airfoil extending from a base to a tip of the airfoil and integrally formed with no more than one outer platform at the tip and/or no more than one inner platform at the base. The airfoil may extend longitudinally or radially from the base to the tip, the outer platform may extend transversely or circumferentially from the tip in a right hand or a clockwise direction or a left hand or a counter-clockwise direction, and the inner platform may extend transversely or circumferentially from the base in the right hand or the clockwise direction or the left hand or the counter-clockwise direction.

The singlet includes parallel composite plies or woven fibers extending through the airfoil and through the outer and/or the inner platforms. Outer and/or inner curved sections may extend between the outer and/or inner platforms and the airfoil respectively. The outer and/or inner curved sections may be circularly arced and have outer and/or inner radii respectively.

An assembly of composite airfoil singlets comprising may include a circular row of the composite airfoil singlets depending radially inwardly from and mounted to an outer shroud or casing. Outer and/or inner fasteners may secure the outer and inner platforms to the outer shroud or casing and an inner shroud respectively and may include shanks extending substantially perpendicularly from outer and inner fastening plates though platform holes in the outer and inner platforms and through outer and inner holes in the outer shroud or casing and the inner shroud respectively. Nuts may be screwed on threaded ends of the shanks.

The fastening plates and shanks may be integrally formed. The outer and inner fastening plates may substantially fully or partially cover the outer and inner platforms respectively.

BRIEF DESCRIPTION OF THE DRAWINGS

The subject matter which is regarded as the invention is particularly pointed out and distinctly claimed in the concluding part of the specification. The invention, in accordance with preferred and exemplary embodiments, together with further objects and advantages thereof, is described in the following detailed description taken in conjunction with the accompanying drawings in which:

FIG. 2 is a perspective view illustration of an exemplary airfoil singlet with no more than one platform at either end of the airfoil.

FIG. 3 is a cross-sectional view illustration of the singlet through 3-3 in FIG. 2.

DETAILED DESCRIPTION OF THE INVENTION

Figure 1:
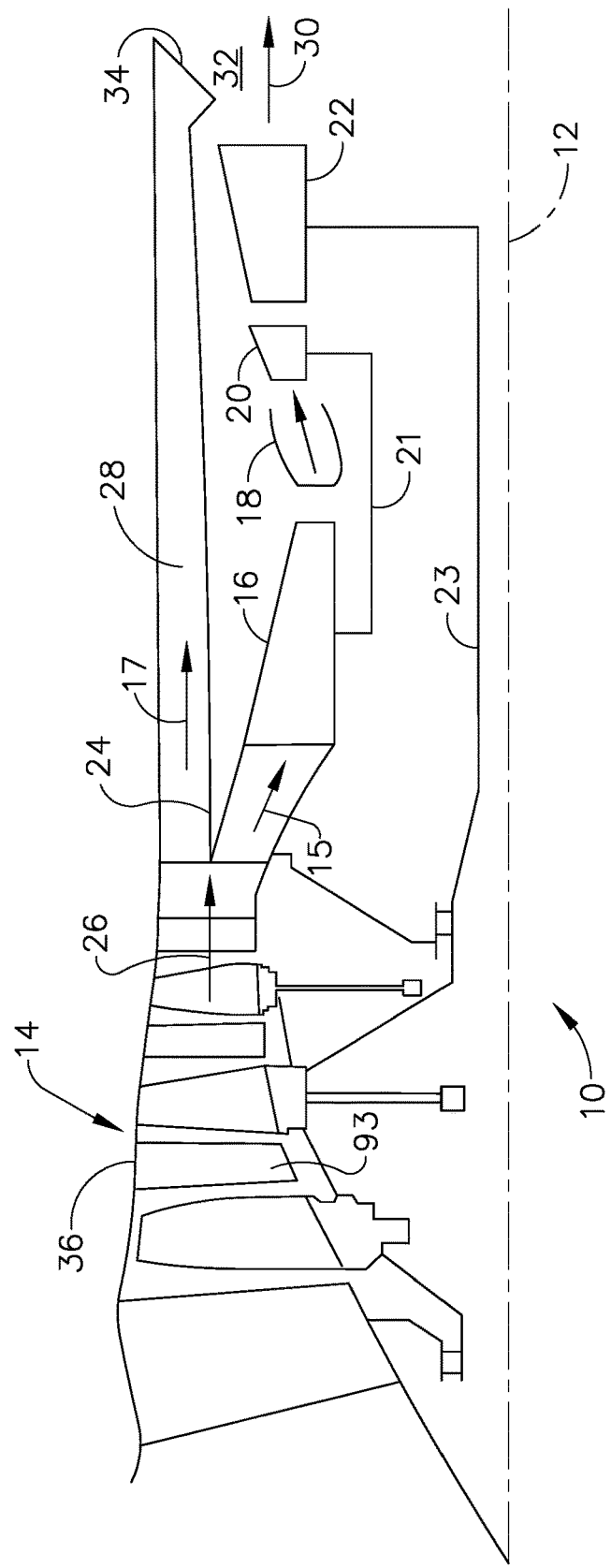
FIG. 1 is a longitudinal part sectional and part diagrammatical view illustration of an exemplary embodiment of an aircraft turbofan gas turbine engine with an exemplary composite airfoil singlet with no more than one platform at either end of the airfoil.

Illustrated in FIG. 1 is an exemplary turbomachine illustrated as an aircraft turbofan gas turbine engine 10 circumscribed about an engine centerline axis 12. The engine 10 includes, in downstream serial flow communication, a fan section 14, a high pressure compressor 16, a combustor 18, a high pressure turbine (HPT) 20, and a low pressure turbine (LPT) 22. The HPT or high pressure turbine 20 is joined by a high pressure drive shaft 21 to the high pressure compressor 16. The LPT or low pressure turbine 22 is joined by a low pressure drive shaft 23 to the fan section 14. A flow splitter 24 surrounding the high pressure compressor 16 immediately behind the fan section 14 splits fan air 26 pressurized by the fan section 14 into a radially inner stream of core air flow 15 channeled through the high pressure compressor 16 and a radially outer stream of bypass air flow 17 channeled through a bypass duct 28 surrounding the high pressure compressor 16, combustor 18, high pressure turbine 20, and low pressure turbine 22. Exhaust gas 30 from the low pressure turbine 22 and bypass air flow 17 are directed into an exhaust section 32 and then into an exhaust nozzle 34. A fan vane 36 in the fan section 14 may include a composite airfoil singlet 40 illustrated more particularly in FIGS. 2 and 7.

Figure 4:
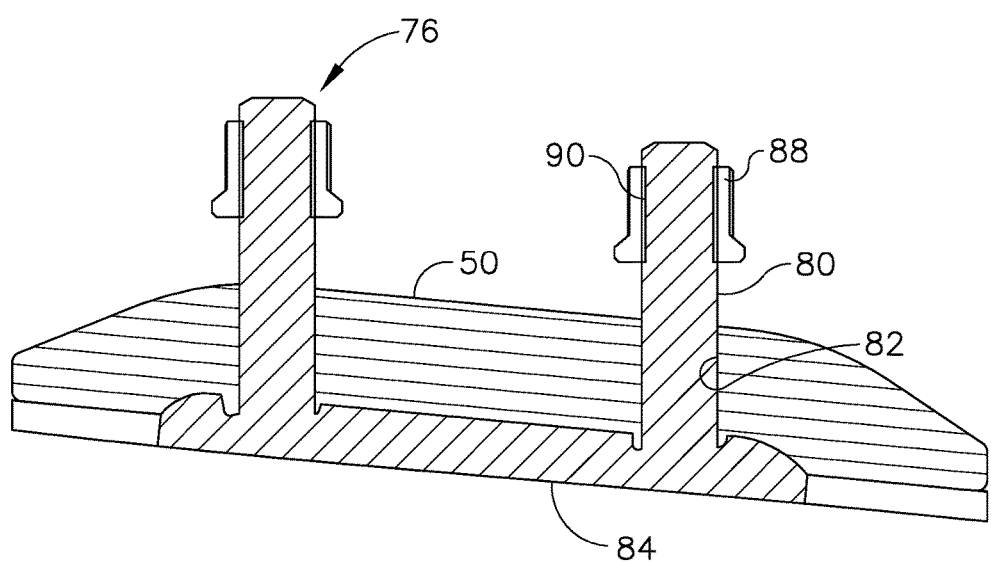
FIG. 4 is a cross-sectional view illustration of an outer platform of the singlet through 4-4 in FIG. 2.
Figure 5:
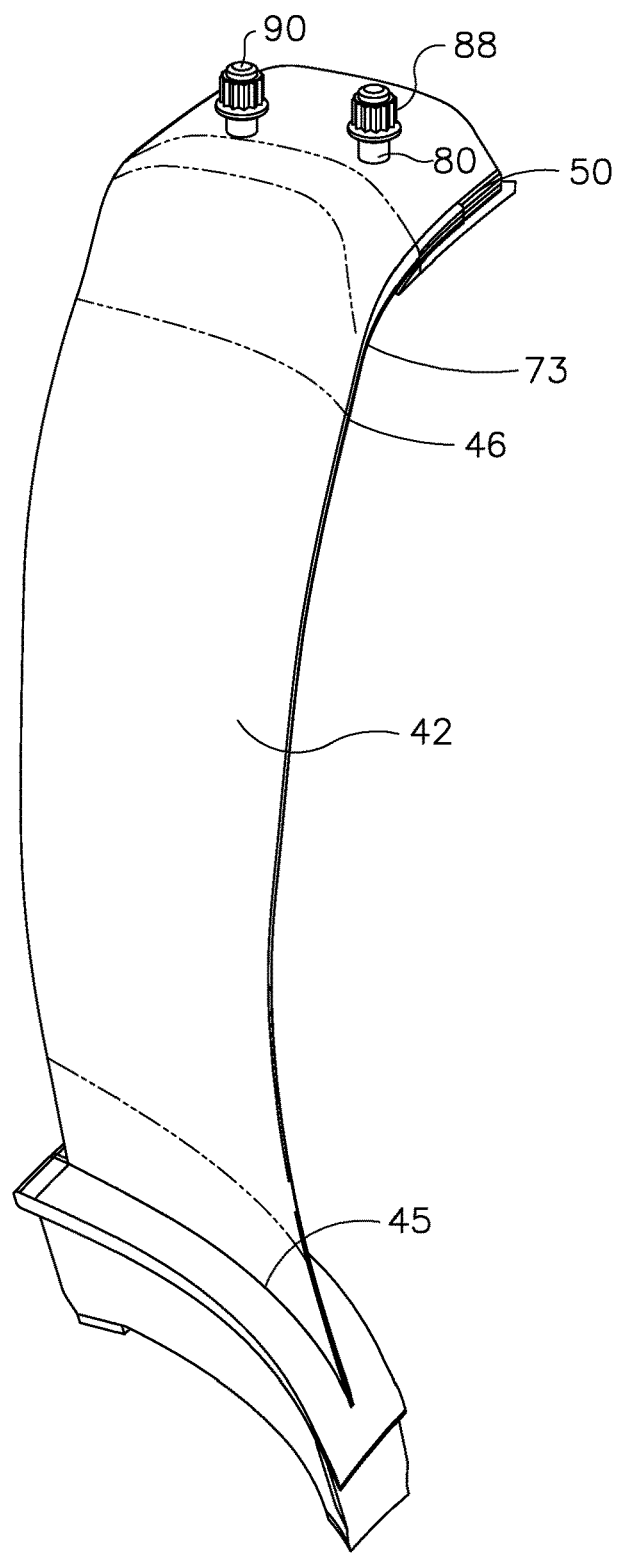
FIG. 5 is a perspective view illustration of an alternative airfoil singlet with only an outer integral platform at a tip the airfoil and no inner integral platform at the base of the airfoil.
Figure 9:
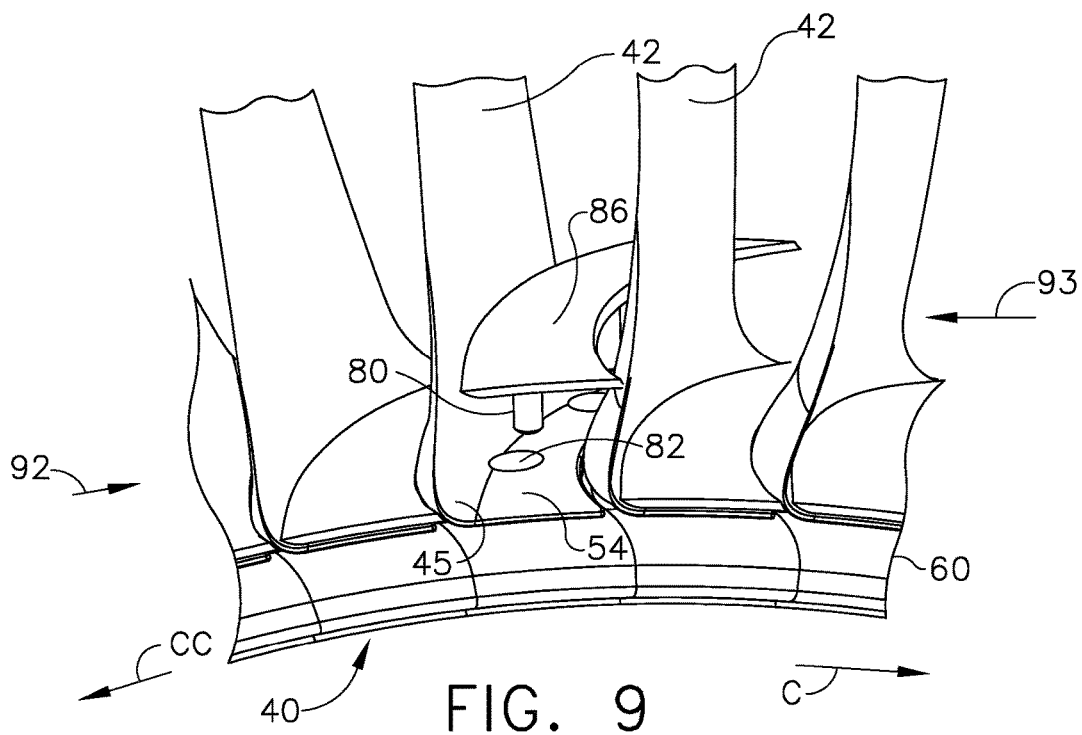
FIG. 9 is a partially exploded perspective view illustration of an inner portion of the airfoil singlet and an inner backer plate illustrated in FIG. 7.

An exemplary embodiment of a composite airfoil singlet 40 illustrated in FIG. 2 includes an airfoil 42 integrally or monolithically formed with no more than one platform 44 at either end of the airfoil 42. The airfoil extends from a base 45 to a tip 46 with no more than one outer platform 50 extending circumferentially in a clockwise direction C or a counter-clockwise direction CC from the tip 46 and/or no more than one inner platform 54 extending circumferentially from the base 45 in a clockwise direction C or a counter-clockwise direction CC as shown in FIG. 9. The composite airfoil singlet 40 is made from parallel composite plies 56 or woven fibers extending through the entire singlet 40, through the airfoil 42 and through the outer or inner platforms 50, 54 or both the outer and inner platforms 50, 54 as illustrated in FIGS. 3 and 4. The composite airfoil singlet 40 illustrated in FIG. 5 has only a single outer platform 50 at the tip 46 of the airfoil 42.

The exemplary embodiment of the composite airfoil singlet 40 illustrated in FIGS. 2 and 3 includes outer and inner platforms 50, 54 which extend circumferentially away from suction and pressure sides 68, 70 of the airfoil 42 respectively. Outer and inner curved sections 73, 75 of the singlet 40 extend between the outer and inner platforms 50, 54 and the airfoil 42 respectively. The outer and inner curved sections 73, 75 may be circularly arced and include outer and inner radii 72, 74 respectively. The parallel composite ply singlet 40 may be made by multi-axis compression molding or by resin transfer molding.

Figure 6:
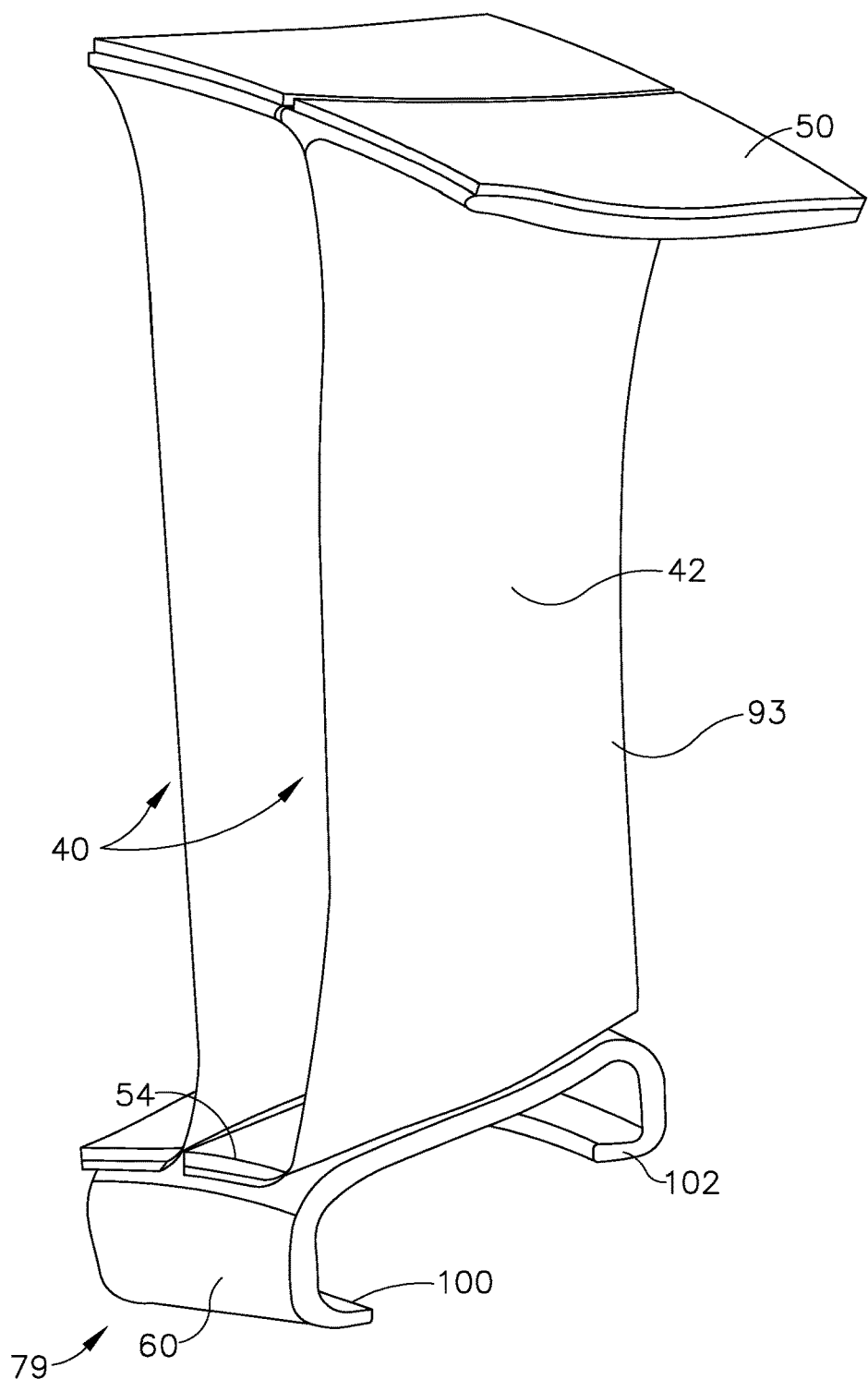
FIG. 6 is a perspective view illustration of two of the airfoil singlets illustrated in FIG. 2 mounted on an inner shroud.
Figure 7:
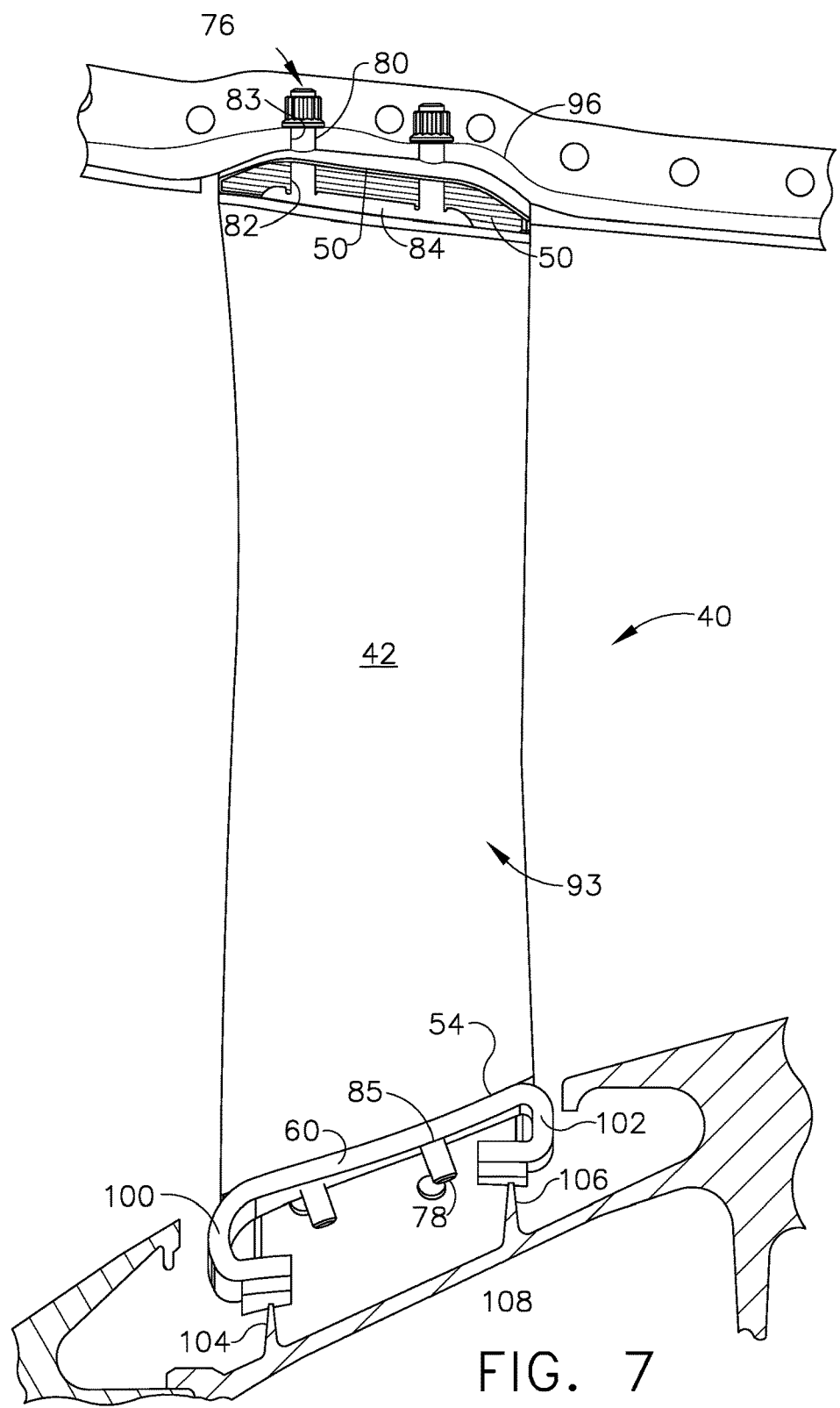
FIG. 7 is a cross-sectional schematical view illustration of the airfoil singlet illustrated in FIG. 2 in a compressor section of an exemplary gas turbine engine.
Figure 8:
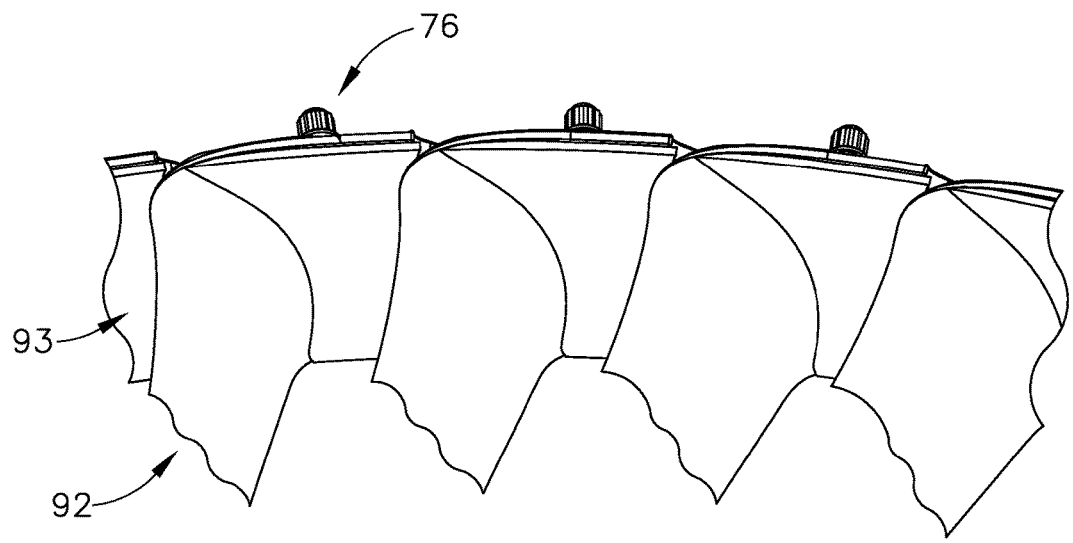
FIG. 8 is a perspective view illustration of an outer portion of the airfoil singlet and an outer backer plate illustrated in FIG. 7.
Figure 10:
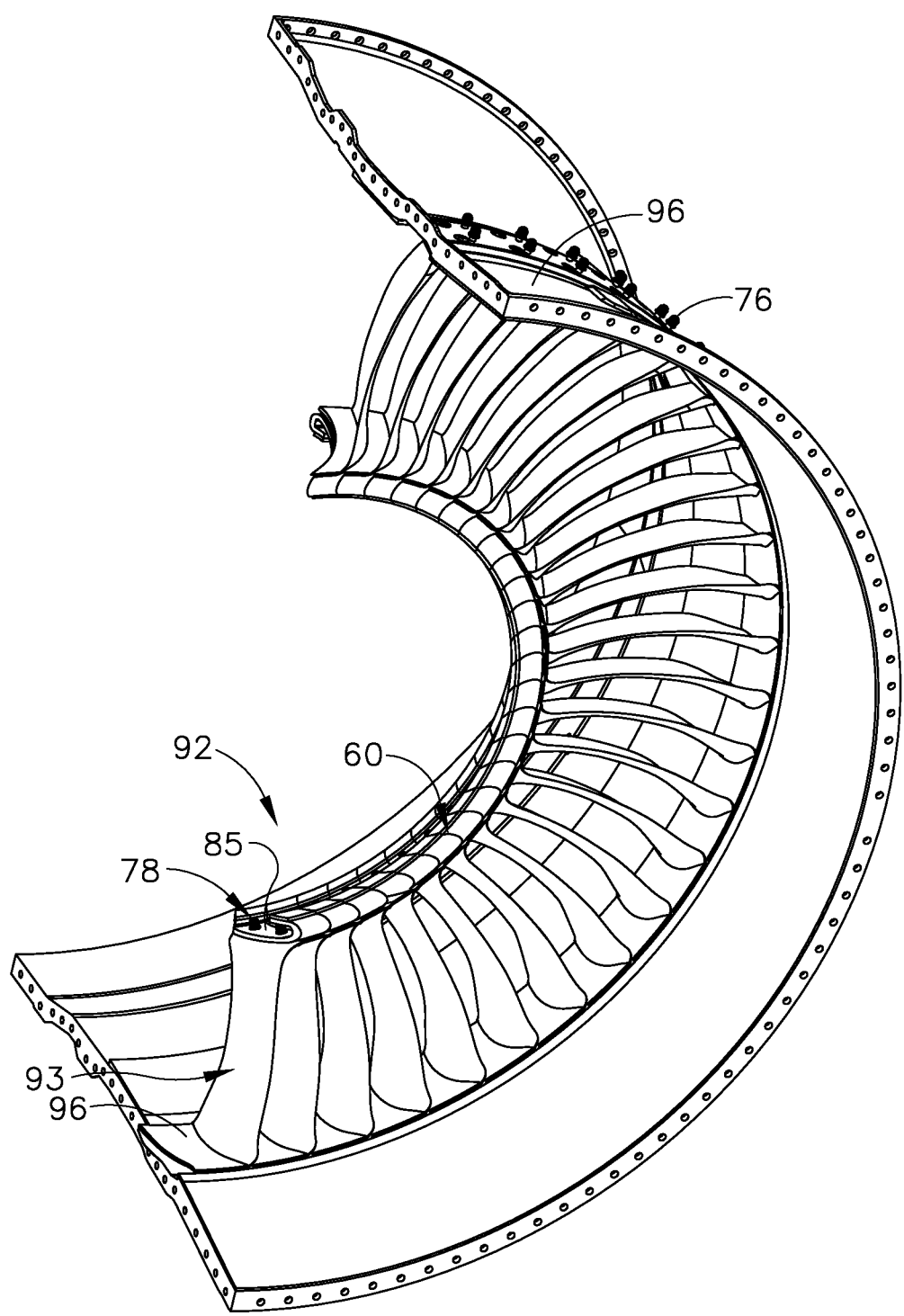
FIG. 10 is a perspective view illustration of a stage of airfoil singlets in a compressor half casing in the compressor section illustrated in FIG. 7.

FIGS. 2, 4, 6, 7, and 10 illustrate outer and inner fasteners 76, 78 used to secure the singlets 40 in the turbomachine or engine 10 by the outer and inner platforms 50, 54. A circular row 93 of the singlets 40, as illustrated in FIGS. 1 and 10, extend radially inwardly from and are mounted to an outer shroud or casing 96 by outer fasteners 76. The singlets 40 extend radially inwardly to and are mounted to the inner shroud 60 by the inner fasteners 78. The inner shroud 60 includes forward and aft flanges 100, 102 which seal with rotating forward and aft seals 104, 106 on a rotor 108 of the turbomachine or engine 10 as illustrated in FIG. 7.

Referring to FIGS. 4, 7, and 9 outer and inner fasteners 76, 78 include shanks 80 extending substantially perpendicularly from outer and inner fastening plates 84, 86 though platform holes 82 in the outer and inner platforms 50, 54 respectively and through outer and inner holes 83, 85 in the outer shroud or casing 96 and the inner shroud 60 respectively. Nuts 88 screw on threaded ends 90 of the shanks 80 secure the outer and inner platforms 50, 54 to the outer shroud or casing 96 and the inner shroud 60 respectively. The fastening plates and shanks may be integrally formed. The outer and inner fasteners 76, 78 may fully or partially cover the outer and inner platforms 50, 54 respectively.

FIG. 6 illustrates two adjacent singlets 40 mounted together on a common inner shroud 60 to form a doublet 79 which may be used to construct an entire stage of vanes. FIGS. 2-10 illustrate a stator vane assembly 92 as may be found in the engine 10. A circular row 93 of the singlets 40, as illustrated in FIG. 2, depend radially inwardly from and are mounted to an outer shroud or casing 96 by the outer fasteners 76. The singlets 40 extend radially inwardly to and are mounted to the inner shroud 60 by the inner fasteners 78. The inner shroud 60 includes forward and aft flanges 100, 102 which seal with rotating forward and aft seals 104, 106 on a rotor 108 of the turbomachine or engine 10 as illustrated in FIG. 7.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A composite airfoil singlet comprising:

an airfoil extending from a base to a tip of the airfoil, and the airfoil integrally formed with no more than one outer platform at the tip, or no more than one inner platform at the base, or both, and parallel composite plies or woven fibers extended through the airfoil and through one or both of the outer platform or the inner platform, a fastener securing the outer platform to an outer shroud, or an inner platform to an inner shroud, or both, wherein the fastener includes a shank integrally formed to a fastening plate, wherein the shank is extended substantially perpendicularly from the fastening plate though a platform hole in one or both of the outer platform or the inner platform, and further wherein the shank is extended substantially perpendicularly through a hole in one or both of the outer shroud or the inner shroud, and a nut screwed onto a threaded end of the shank.

2. The singlet as claimed in claim 1, further comprising: the airfoil extending longitudinally or radially from the base to the tip, and airfoil singlet comprises both of the outer platform extending transversely or circumferentially from the tip in a right hand or a clockwise direction or a left hand or a counter-clockwise direction, and the inner platform extending transversely or circumferentially from the base in the right hand or the clockwise direction or the left hand or the counter-clockwise direction.

3. The singlet as claimed in claim 1, further comprising outer and/or inner curved sections extending between the outer and/or inner platforms and the airfoil respectively.

4. The singlet as claimed in claim 3, further comprising the outer and/or inner curved sections being circularly arced and having outer and/or inner radii respectively.

5. An assembly of composite airfoil singlets comprising:
a circular row of composite airfoil singlets extending radially inwardly from and mounted to an outer shroud or casing,
each of the airfoil singlets including an airfoil extending radially from a base to a tip of the airfoil,
the airfoil integrally formed with no more than one outer platform at the tip, no more than one inner platform at the base, or both,
the outer platform extending circumferentially from the tip in a clockwise direction or a counter-clockwise direction,
the inner platform extending circumferentially from the base in the clockwise direction or the counter-clockwise direction,
parallel composite plies or woven fibers extended through the airfoil and through one or both of the outer platform or the inner platform,
a fastener securing the outer platform to the outer shroud, or an inner platform to the inner shroud, or both,
wherein the fastener includes a shank integrally formed to the fastener, wherein the shank is extended substantially perpendicularly from a fastening plate though platform holes in one or both of the outer platform or the inner platform, and further wherein the shank is extended substantially perpendicularly through a hole in one or both of the outer shroud or the inner shroud, and
nuts screwed on threaded ends of the shanks.

6. The assembly as claimed in claim 5, further comprising outer and inner curved sections extending between the outer and inner platforms and the airfoil respectively.

7. The assembly as claimed in claim 6, further comprising the outer and inner curved sections being circularly arced and having outer and inner radii respectively.

8. The assembly as claimed in claim 5, further comprising an outer curved section extended between the outer platform and the airfoil, an inner curved section extended between the inner platform and the airfoil, or both.

9. The assembly as claimed in claim 8, further comprising the outer and inner curved sections being circularly arced and having outer and inner radii respectively.

10. The assembly as claimed in claim 5, further comprising the fastening plate substantially fully or partially covering the outer platform, the inner platform or both.

11. The assembly as claimed in claim 5,
wherein the outer fastener secures the outer platform to the outer shroud or casing.

12. The assembly as claimed in claim 11, further comprising outer curved sections extending between the outer platforms and the airfoil and the outer curved sections being circularly arced and having outer radii.

13. The assembly as claimed in claim 11, further comprising the fastening plates and shanks being integrally formed.

14. The assembly as claimed in claim 11, further comprising the fastening plates substantially fully or partially covering the outer platforms.

15. The assembly as claimed in claim 5,
wherein the inner fastener secures the inner platform to the inner shroud.

16. The assembly as claimed in claim 15, further comprising inner curved sections extending between the inner platforms and the airfoil and the inner curved sections being circularly arced and having inner radii.

17. The assembly as claimed in claim 15, further comprising the fastening plates substantially fully or partially covering the inner platforms.

* * * * *